United States Patent [19]
Ishikawa

[11] Patent Number: 5,508,951
[45] Date of Patent: Apr. 16, 1996

[54] ARITHMETIC APPARATUS WITH OVERFLOW CORRECTION MEANS

[75] Inventor: Toshihiro Ishikawa, Yokohama, Japan

[73] Assignee: Matsushita Electric Industrial Co., Ltd., Osaka, Japan

[21] Appl. No.: 339,202

[22] Filed: Nov. 10, 1994

[30] Foreign Application Priority Data

Nov. 12, 1993 [JP] Japan ................................ 5-306054
May 23, 1994 [JP] Japan ................................ 6-130856

[51] Int. Cl.⁶ .................................................. G06F 11/00
[52] U.S. Cl. ............................................................ 364/745
[58] Field of Search .............................. 364/736.5, 737, 364/745

[56] References Cited

U.S. PATENT DOCUMENTS 4,945,507  7/1990  Ishida et al. ............................ 364/737

FOREIGN PATENT DOCUMENTS 62-11933  1/1987  Japan.
4167170  6/1992  Japan.

*Primary Examiner*—David H. Malzahn
*Attorney, Agent, or Firm*—Lowe, Price, LeBlanc & Becker

[57] ABSTRACT

An arithmetic apparatus includes an arithmetic logic unit for performing a given arithmetic operation of double precision data having a preselected number of bits, a first register storing results of the arithmetic operation of higher-order bits in the double precision data, a second register storing results of the arithmetic operation of lower-order bits in the double precision data, an overflow-detection circuit for detecting overflow conditions of the results of the arithmetic operations, a maximum/minimum value-setting circuit for setting the results of the arithmetic operation to be stored in the first register to one of maximum and minimum values according to the overflow conditions, and a correction circuit for correcting an output value indicative of he results of the arithmetic operation provided by the second register to one of a first value defined by a bit sequence of 0s and a second value defined by a bit sequence of 1s according to the overflow condition.

15 Claims, 7 Drawing Sheets

ARITHMETIC APPARATUS WITH OVERFLOW CORRECTION MEANS

BACKGROUND OF THE INVENTION

1. Technical Field of the Invention

The present invention relates generally to an arithmetic apparatus which may be built in a digital signal processor for fixed-point arithmetic operations, and more particularly to an improved arithmetic apparatus which is designed to perform an overflow correction in double precision and/or to perform parallel arithmetic operations with high accuracy.

2. Background Art

In recent years, digital signal processors have been widely used in digital portable telephones, for example. Such built-in type digital signal processors usually have an arithmetic logic unit for a fixed-point arithmetic operation from the standpoint of economic production costs.

In a fixed-point arithmetic operation unit, a decimal point is often placed on the right of a number to be displayed for handling the number as an integer. In addition, when the results of an arithmetic operation overflow, an overflow correction is carried out to correct it to either a positive maximum value or a negative minimum value according to a direction of the overflow.

An overflow correction in a conventional arithmetic apparatus will be described below with reference to FIG. 9.

The conventional arithmetic apparatus includes generally N-bit data storage memories 1 and 2, an arithmetic logic unit (ALU) 5, buses 3 and 4 for transmitting data stored in the memories 1 and 2 to the ALU 5 respectively, an overflow-detection circuit 6, a carry flag register 7, a maximum/minimum value-setting circuit 8, and operation result-storage registers 9 and 10.

The overflow-detection circuit 6 is connected to the ALU 5 and includes a circuit structure, as shown in FIG. 10, which outputs a carry from the highest-order position in the ALU 5 as an overflow sign signal 12 (a "0" denotes a positive value and a "1" denotes a negative value) and also provides as an overflow-detection signal 11 a "0" signal when a carry value of the number at the highest-order position agrees with a carry value from the next right position and a "1" signal when disagreement is established.

The carry flag register 7 is arranged to store a carry occurring in the most significant bit of the lower-order positions in a double precision arithmetic operation.

The maximum/minimum value-setting circuit 8, as shown in FIG. 11, includes a maximum/minimum value-outputting element and a multiplexer. The maximum/minimum value-outputting element is designed to provide a negative minimum value "10000 . . ." when the overflow sign signal 12 shows a negative value (1) and a positive maximum value "01111 . . ." when the overflow sign signal 12 is a positive value (0). The multiplexer serves as a switching means which is responsive to the overflow-detection signal 11 of 0 to produce the output from the ALU 5 as is, while it provides the output from the maximum/minimum value-outputting element when the overflow-detection signal 11 is a 1. The registers 9 and 10 store therein the outputs from the maximum/minimum value-setting circuit 8.

Assume that the number of bits N of data in the memories 1 and 2, the buses 3 and 4, the ALU 5, and the registers 9 and 10 is sixteen (16). In the double precision arithmetic operation, an addition or subtraction is carried out twice for handling 32 (=2N) bit data transmitted from the buses 3 and 4, respectively.

A positive maximum value formed with 16 bits may be expressed in 2's complement form as "7 f f f", while a negative minimum may similarly be expressed as "8000". Thus, the maximum/minimum value-setting circuit 8 provides the positive maximum value "7 f f f" when the overflow-detection signal 11 is active (1) and the overflow sign signal 12 is positive (0), and the negative minimum value "8000" when the overflow-detection signal 11 is active and the overflow sign signal 12 is negative (1).

Hereinafter, addition or subtraction operations of double precision data X and Y (2N=32 bits) will be discussed.

Addition or Subtraction of lower-order bits of both the data X and Y

Data XL formed with 16 lower-order bits of the data X is first read out of the memory 1 to output it to the bus 3. Similarly, from the memory 2, data YL formed with 16 lower-order bits of the data Y is read to output it to the bus 4. The ALU 5 performs an addition or subtraction operation of the data XL and YL and stores resultant data in the register 10 through the maximum/minimum value-setting circuit 8. In addition, a carry produced at the highest-order position is stored in the carry flag register 7. The maximum/minimum value-setting circuit 8 then transfers the output from the ALU 5 to the register 10.

Addition or Subtraction of higher-order bits of both the data X and Y

Data XU defined by 16 higher-order bits of the data X is first read out of the memory 1 to output it to the bus 3. Next, data YU defined by 16 higher-order bits of the data Y is read out of the memory 2 to output it to the bus 4. The ALU 5 performs an addition or subtraction operation of the data XU and YU and a value of the carry flag register 7, and stores results thereof in the register 9 through the maximum/minimum value-setting circuit 8.

The overflow-detection circuit 6, when the results of the arithmetic operations in the ALU 5 overflow, provides the overflow-detection signal 11 and the overflow sign signal 12 indicative of a direction of the overflow. The maximum/minimum value-setting circuit 8, when the overflow-detection signal 11 is active (1) and the overflow sign signal 12 is positive (0), provides the positive maximum value "7 f f f" in 2's complement form, while it outputs the negative minimum value "8000" in 2's complement form when the overflow-detection signal 11 is active and the overflow sign signal 12 is negative. Further, it provides the output from the ALU 5 as is when the overflow-detection signal 11 is not active (0).

With the above two-step arithmetic operations, the addition and subtraction of the double precision data are performed. The results of the arithmetic operation of the 16 lower-order bits are stored in the register 10, while the results of the 16 higher-order bits are stored in the register 9.

The above conventional arithmetic apparatus, however, has suffered from a drawback in that the data formed with the 16 lower-order bits of the 32-bit operation results is not corrected even if overflow occurs, so that the 32-bit operation results are not corrected to either a 32-bit positive maximum value or a 32-bit negative minimum value.

Further, in recent years, for error correction in digital communication, a convolution code has become used frequently. For decoding the convolution code, the Viterbi decoding process is useful. The Viterbi decoding is accomplished by repeating the so-called addition comparison selection (ACS) arithmetic operation. The ACS arithmetic operation is a process wherein addition is performed twice and two results of the addition are compared in number size to select either of them. The repetition of the ACS arithmetic operation thus consumes considerable time until the Viterbi decoding has been completed.

SUMMARY OF THE INVENTION

It is therefore a principal object of the present invention to avoid the disadvantages of the prior art.

It is another object of the present invention to provide an arithmetic apparatus which is designed to perform an arithmetic operation at high speed and to carry out an overflow correction with high accuracy upon occurrence of overflow.

According to one aspect of the present invention, there is provided an arithmetic apparatus which comprises an arithmetic operation means for performing given arithmetic operations of double precision data having a preselected number of bits, a first register storing results of the arithmetic operation of higher-order bits in the double precision data, a second register storing results of the arithmetic operation of lower-order bits in the double precision data, an overflow-detection means for detecting overflow conditions of the results of the arithmetic operations performed by the arithmetic operation means, a maximum/minimum value-setting means for setting the results of the arithmetic operation to be stored in the first register to one of maximum and minimum values according to the overflow conditions detected by the overflow-detection means, and a correction means for correcting an output value indicative of the result of the arithmetic operation outputted from the second register to one of a first value defined by a bit sequence of 0s and a second value defined by a bit sequence of 1s according to the overflow condition detected by the overflow-detection means.

According to another aspect of the invention, there is provided an arithmetic apparatus which comprises an arithmetic operation means for performing a given arithmetic operation of higher-order bits and lower-order bits of double precision data, an overflow-detection means for detecting overflow conditions of results of the arithmetic operation performed by the arithmetic operation means, a maximum/minimum value-setting means for setting the results of the arithmetic operation in the higher-order bits of the double precision data to one of maximum and minimum values according to the overflow conditions detected by the overflow-detection means, and a correction means for correcting the results of the arithmetic operation in the lower-order bits of the double precision data to one of a first value defined by a bit sequence of 0s and a second value defined by a bit sequence of 1s according to the overflow conditions detected by the overflow-detection means.

According to a further aspect of the invention, there is provided an arithmetic apparatus which comprises an arithmetic operation means for performing arithmetic operations of a plurality of data in parallel, a plurality of overflow-detection means for detecting overflow conditions of results of the arithmetic operations performed by the arithmetic operation means, respectively, and a plurality of maximum/minimum value-setting means for setting the results of the arithmetic operations performed by the arithmetic operation means to one of maximum and minimum values according to the overflow conditions detected by the overflow-detection means, respectively.

In the preferred mode, a register may further be provided for storing one of the results of the arithmetic operations performed by the arithmetic operation means. At least one of the maximum/minimum value-setting means is provided to correct an output value indicative of the results of the arithmetic operation stored in the register to one of maximum and minimum values according to the overflow conditions detected by corresponding one of the overflow-detection means.

The arithmetic operation means performs a given arithmetic operation of double precision data having a preselected number of bits. A correction means may further be provided for correcting results of the given arithmetic operation of lower-order bits in the double precision data to one of a first value defined by a bit sequence of 0s and a second value defined by a bit sequence of 1s according to the overflow conditions detected by corresponding one of the overflow-detection means.

According to a still another aspect of the present invention, there is provided a method for performing, in parallel, a plurality of arithmetic operations of data having a preselected number of bits less than the number of bits handled by an arithmetic apparatus, comprising the steps of detecting overflow conditions of results of the arithmetic operations, respectively, and correcting the overflowing results of the arithmetic operations to one of maximum and minimum values each formed with the preselected number of bits according to the overflow conditions detected.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
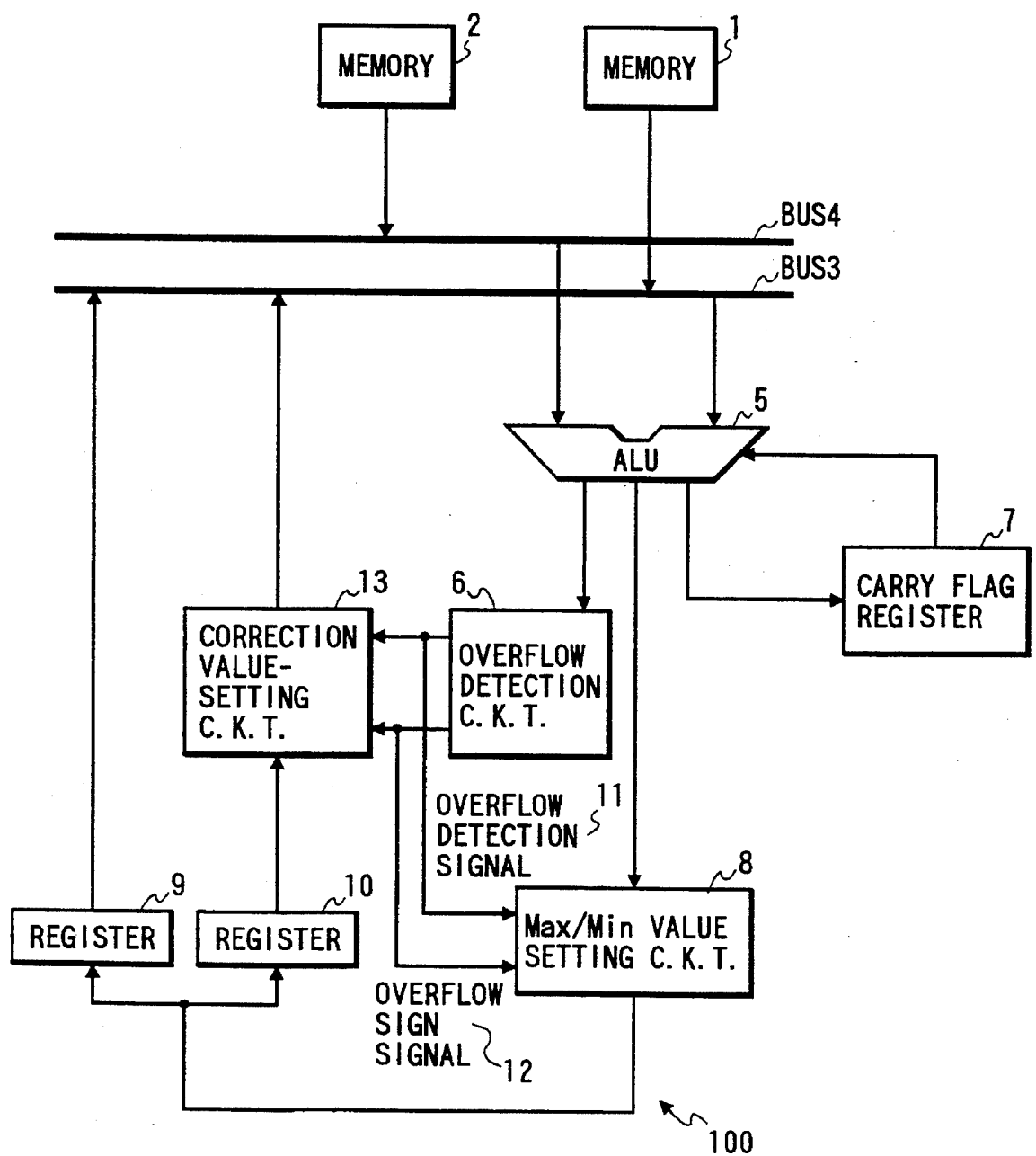
FIG. 1 is a block diagram which shows an arithmetic apparatus according to the present invention.

Referring now to the drawings, wherein like numbers refer to like parts in several views, particularly to FIG. 1, there is shown an arithmetic apparatus 100 which is useful in performing a fixed-point arithmetic operation in digital data processing systems such as digital portable telephones.

The arithmetic apparatus 100 includes generally memories 1 and 2 for storing data defined by N bits, an arithmetic logic unit (ALU) 5, buses 3 and 4 for transmitting the data stored in the memories 1 and 2 to the ALU 5 respectively, an overflow-detection circuit 6, a carry flag register 7, a maximum/minimum value-setting circuit 8, registers 9 and 10, and a correction value-setting circuit 13.

Figure 2:
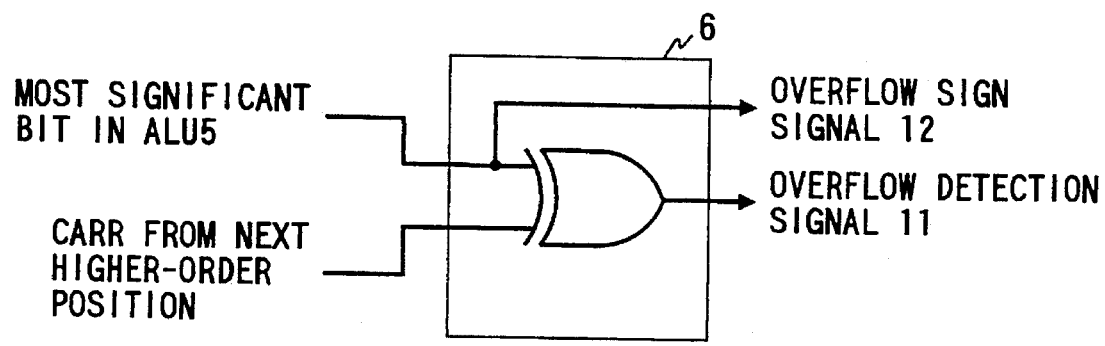
FIG. 2 is a circuit diagram which shows an overflow-detection circuit of an arithmetic apparatus.

The overflow-detection circuit 6 is connected to the ALU 5 and includes a circuit structure, as shown in FIG. 2, which outputs a carry from the highest-order position in the ALU 5 as an overflow sign signal 12 (a "0" denotes a positive value and a "1" denotes a negative value) and also provides as an overflow-detection signal 11 a "0" signal when a carry value at the highest-order position agrees with a carry value from the right position thereof, and a "1" signal when it otherwise disagrees.

The carry flag register 7 is arranged to hold a carry of the most significant bit in the lower-order positions in a double precision arithmetic operation.

Figure 3:
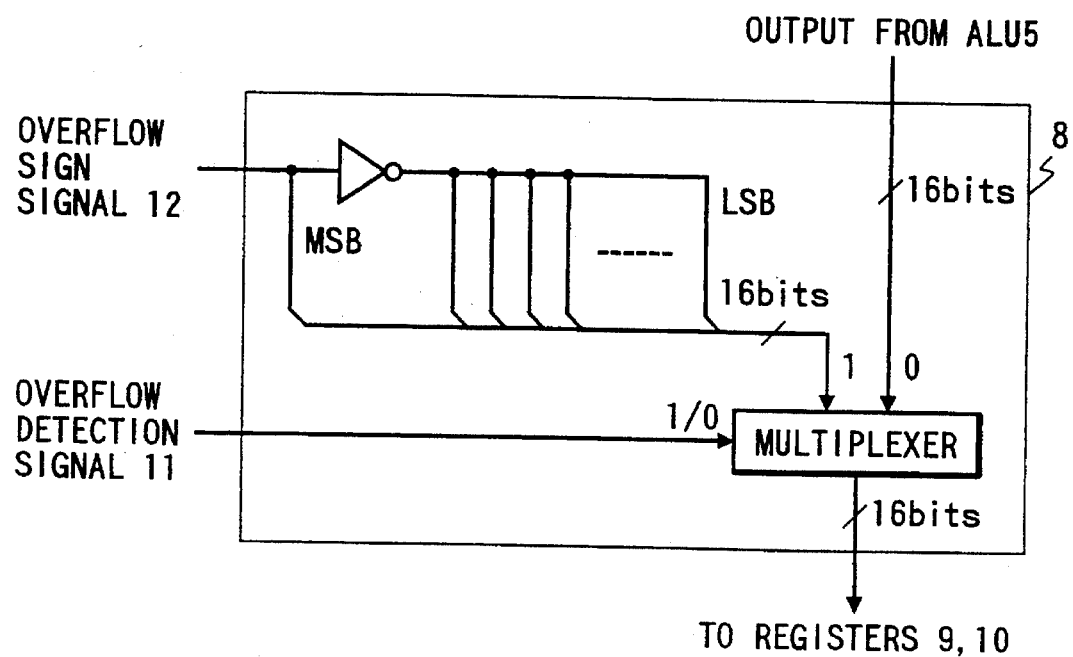
FIG. 3 is a circuit diagram which shows a maximum/minimum value-setting circuit.

The maximum/minimum value-setting circuit 8, as shown in FIG. 3, includes a maximum/minimum value-outputting element and a multiplexer. The maximum/minimum value-outputting element is designed to provide a negative minimum value "10000 . . . " when the overflow sign signal 12 shows a negative value (1), and also provides a positive maximum value "01111 . . . " when the overflow sign signal 12 is a positive value (0). The multiplexer serves as a switching means which is responsive to the overflow-detection signal 11 of 0 to provide the output from the ALU 5 as is, while it provides the output from the maximum/minimum value-outputting element when the overflow-detection signal 11 is a 1. The registers 9 and 10 store therein the outputs from the maximum/minimum value-setting circuit 8.

Figure 4:
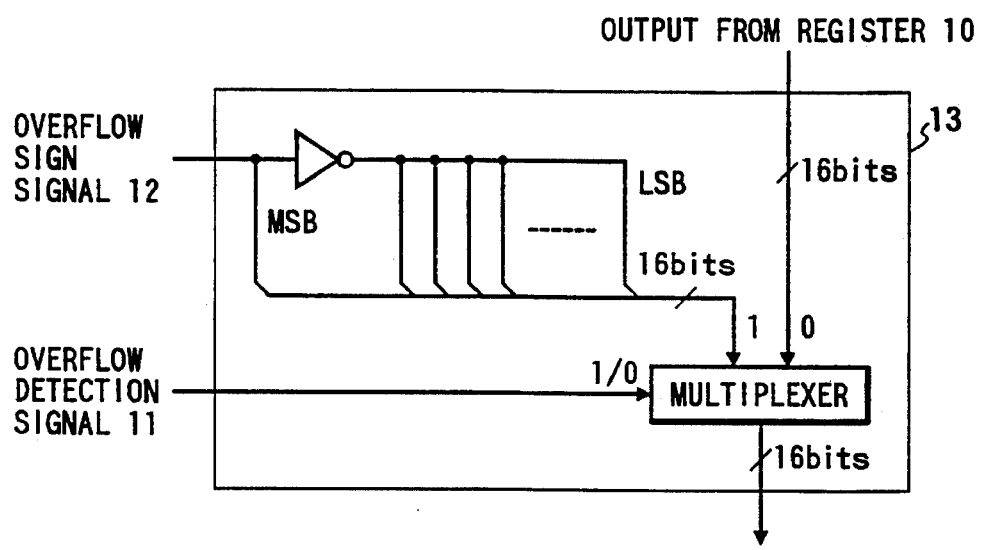
FIG. 4 is a circuit diagram which shows a correction value-setting circuit.

The correction value-setting circuit 13 is arranged to provide to the bus 3 a signal of "f f f f" as the output from the register 10 when the overflow-detection signal 11 is active (1) and the overflow sign signal 12 is positive, a signal of "0000" when the overflow-detection signal 11 is active (1) and the overflow sign signal 12 is negative, and an output value from register 10 when overflow-detection signal 11 is not active (0). The correction value-setting circuit 13, as shown in FIG. 4, includes a correction value-outputting element and a multiplexer. The correction value-outputting element is designed to provide a signal of "0000 . . . " when the overflow sign signal 12 is active (1) and a signal of "1111 . . . " when the overflow sign signal 12 is not active (0). The multiplexer receives the outputs from the correction value-outputting element and the register 10, and serves as a switching means which selects the output from the correction value-outputting element when the overflow-detection signal 11 is active (1), while it selects the output from the register 10 when the overflow-detection signal 11 is not active (0).

An attempt will be made below to describe an addition or subtraction operation of double precision data X and Y (2N=32 bits) in the arithmetic apparatus 100 where the number of bits N of data in the memories 1 and 2, the buses 3 and 4, the ALU 5, the registers 9 and 10 is sixteen (16).

Addition or Subtraction of lower-order bits of both the data X and Y

Data XL formed with 16 lower-order bits of the data X is first read out of the memory 1 to output it to the bus 3. Similarly, from the memory 2, data YL formed with 16 lower-order bits of the data Y is read to output it to the bus 4. The ALU 5 performs an addition or subtraction operation of the data XL and YL and outputs the results thereof. A carry produced in the highest-order position is stored in the carry flag register 7. The maximum/minimum value-setting circuit 8 then transfers the output from the ALU 5 directly to the register 10.

Addition or Subtraction of higher-order bits of both the data X and Y

Data XU formed with 16 higher-order bits of the data X is first read out of the memory 1 to output it to the bus 3. Next, data YU defined by 16 higher-order bits of the data Y is read out of the memory 2 to output it to the bus 4. The ALU 5 performs an addition or subtraction operation of the data XU and YU and a value of the carry flag register 7, and outputs the results thereof to the register 9 through the maximum/minimum value-setting circuit 8.

The overflow-detection circuit 6, when the results of the arithmetic operation in the ALU 5 overflow, provides the overflow-detection signal 11 and the overflow sign signal 12 indicative of a direction of the overflow. The maximum/minimum value-setting circuit 8, when the overflow-detection signal 11 is active (1) and the overflow sign signal 12 is positive (0), provides a positive maximum value "7 f f f" in 2's complement form, while it outputs a negative minimum value "8000" in 2's complement form when the overflow-detection signal 11 is active and the overflow sign signal 12 is negative. Further, it provides the output from the ALU 5 as is when the overflow-detection signal 11 is not active (0).

The correction value-setting circuit 13, when the overflow-detection signal 11 is active and the overflow sing signal 12 shows a positive value, provides a value of "f f f f" as the output from the register 10, while it provides a value of "0000" as the output from the register 10 when the overflow-detection signal 11 is active and the overflow sign signal 12 is negative. Additionally, it provides the output from the register 10 as is when the overflow-detection signal 11 is not active.

With the above arrangements, when the maximum/minimum value-setting circuit 8 corrects the higher-order bit data of the results of arithmetic operation upon occurrence of overflow, the correction value-setting circuit 13 corrects the lower-order bit data of the results of the arithmetic operation so that when the results of addition or subtraction operation overflow in a positive direction, a 32bit positive maximum value (7 ffffff) is outputted, while when the results overflow in a negative direction, a 32bit negative minimum value (80000000) is provided.

The values provided by the correction value-setting circuit 13 may be stored in the register 10.

As apparent from the above discussion, the arithmetic apparatus of this embodiment can perform an overflow correction with high accuracy in the addition or subtraction operation of double precision data. The overflow correction can also be carried out at high speed in the two-step fashion, as described above.

Figure 5:
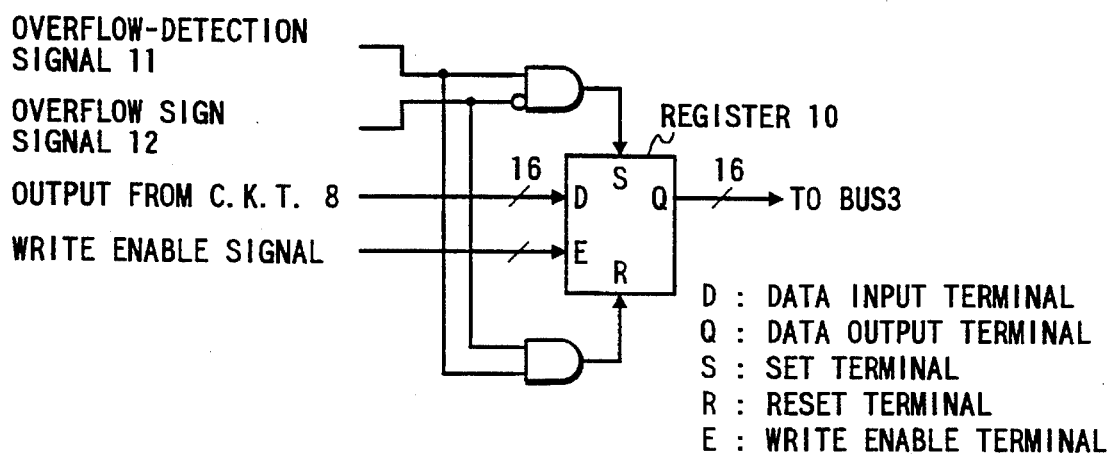
FIG. 5 is a circuit diagram which shows a modification of a correction value-setting circuit.

Referring to FIG. 5, there is shown a second embodiment of the correction value-setting circuit 13 of the arithmetic apparatus 100.

The shown correction value-setting circuit 13 includes the register 10 in itself which has a D latch with a set-reset function.

To a data input terminal D of the register 10, data from the maximum/minimum value-setting circuit 8 is inputted. This data, when a writing-enable terminal E is active, is written in the register 10 so that it is outputted to the bus 3 from a data output terminal Q.

When the overflow-detection signal 11 becomes active and at the same time, the overflow sign signal also becomes active, it will cause a reset terminal R to be active so that the register is reset to "0000" and the data output terminal Q outputs a signal of "0000".

Alternatively, when the overflow-detection signal 11 is active and the overflow sign signal is not active, it will cause a set terminal S to be active so that the register is reset to "f f f f" and the data output terminal Q outputs a signal of "f f f f".

Therefore, when the maximum/minimum value-setting circuit 8 corrects data, in higher-order positions of results of arithmetic operation, to be stored in the register 9, to the maximum or minimum value upon occurrence of overflow, data in lower-order positions of the arithmetic operation results stored in the register 10 is also corrected to "f f f f" or "0000".

Figure 6:
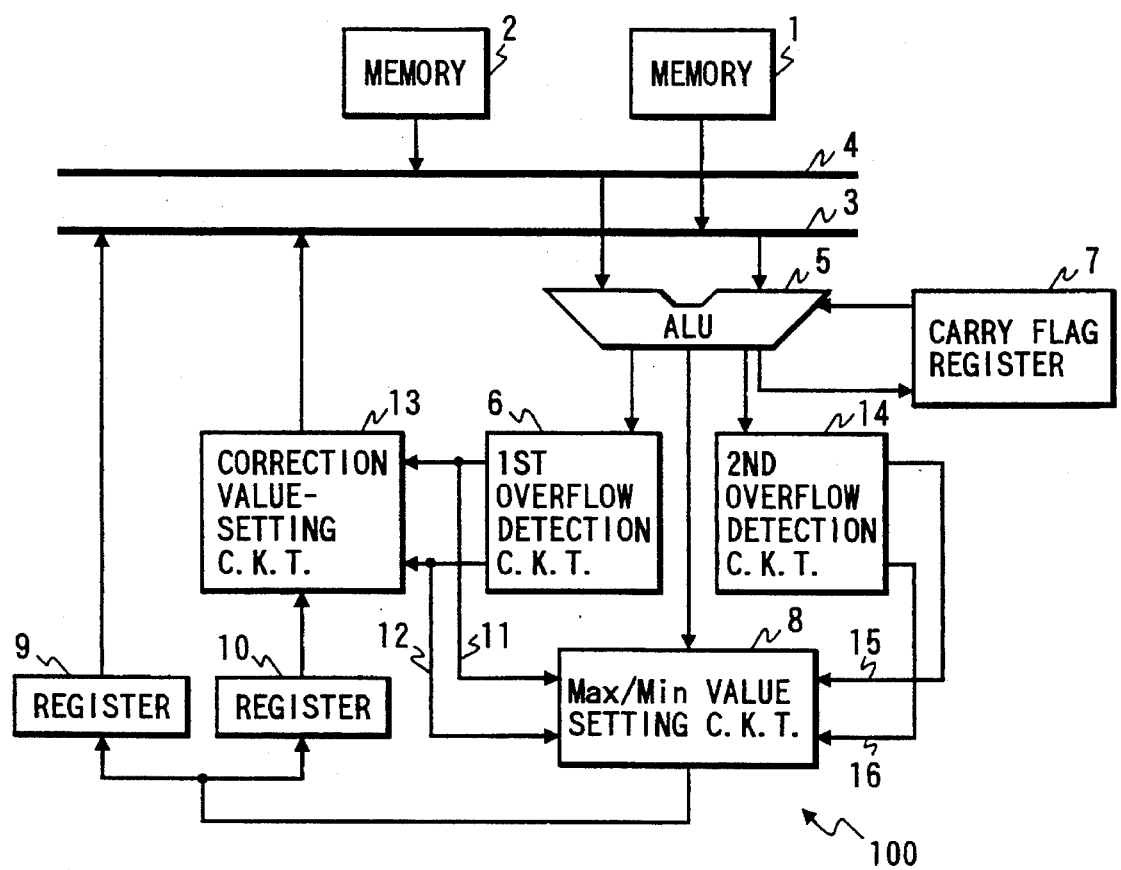
FIG. 6 is a block diagram which shows an arithmetic apparatus according to an alternative embodiment of the invention.

Referring to FIG. 6, there is shown a third embodiment of the arithmetic apparatus 100 of the invention.

The arithmetic apparatus 100 of this embodiment is designed to selectively perform a double precision arithmetic operation and a parallel arithmetic operation of half bit data.

The shown arithmetic apparatus 100 includes an ALU assembly 5 provided with upper and lower 8-bit arithmetic logic units arranged in parallel, a first overflow-detection circuit 6, and a second overflow-detection circuit 14. Other arrangements are basically similar to those of the above first embodiment.

The first overflow-detection circuit 6 has the same circuit structure as shown in FIG. 2, and is adapted to provide a carry bit in the highest-order position of results of arithmetic operation of the ALU assembly 5 as the overflow sign signal 12, and provides the overflow-detection signal 11 of zero (0) when a carry value in the highest-order position agrees with a carry value from the next higher-order position and the overflow-detection signal 11 of one (1) when disagreement is established.

Figure 7:
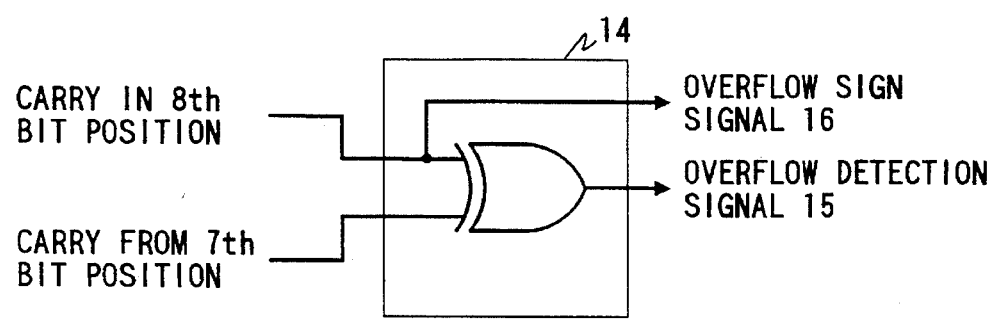
FIG. 7 is a circuit diagram which shows a second overflow-detection circuit.

The second overflow-detection circuit 14 is provided with a circuit structure, as shown in FIG. 7, and provides a carry bit in an 8th lower-order position of the ALU assembly 5 as an overflow sign signal 16 indicative of a direction of overflow: a "0" is provided when the overflow has occurred in a positive direction, a "1" is provided when a direction of the overflow is negative. The second overflow-detection circuit 14 also provides an overflow-detection signal 15 of zero (0) when a carry value in the 8th lower-order position coincides with a carry value from the 7th lower-order position and the overflow-detection signal 15 of one (1) when disagreement is established.

Figure 8:
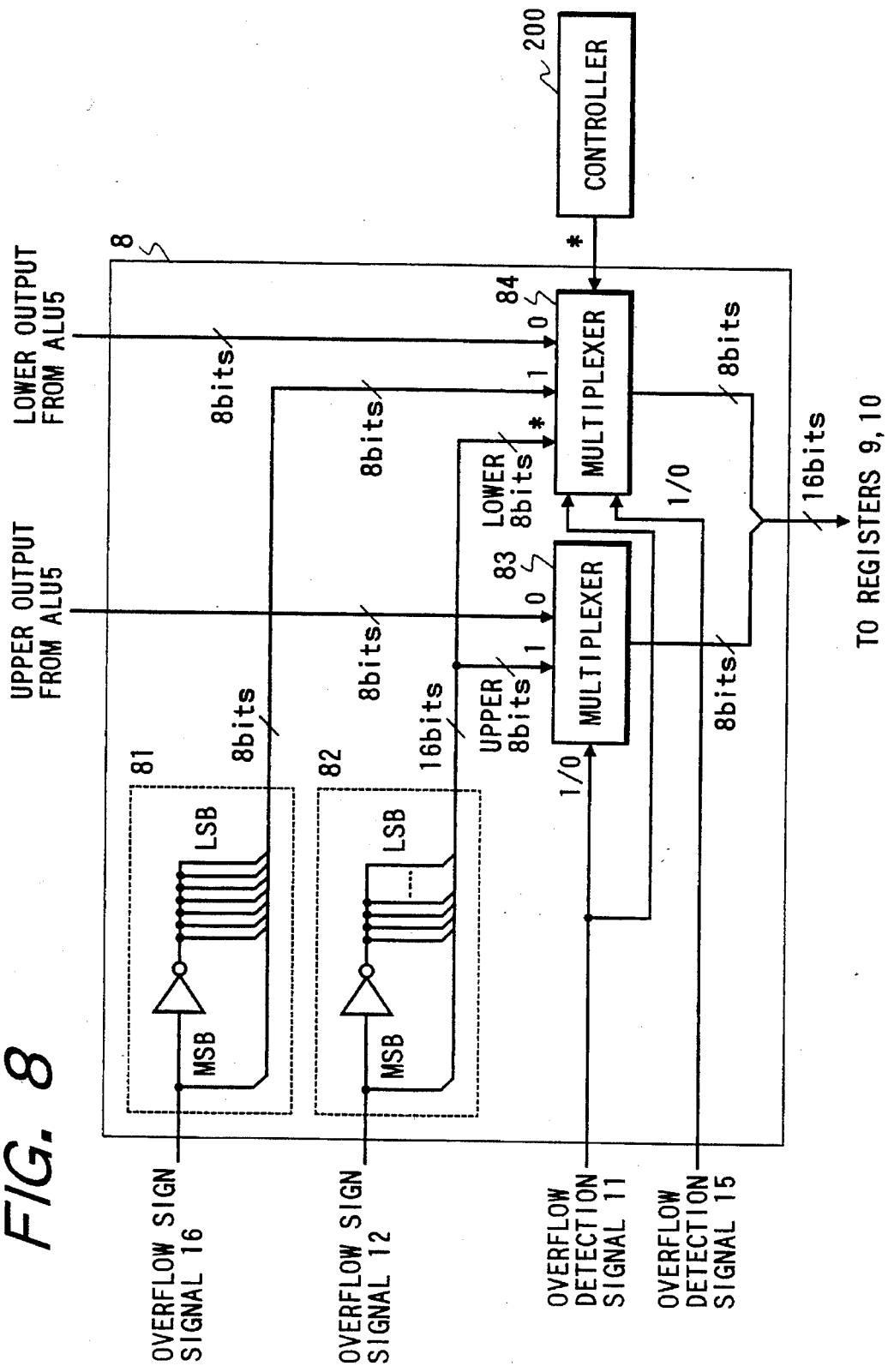
FIG. 8 a circuit diagram which shows a maximum/minimum value-setting circuit of the arithmetic apparatus shown in FIG. 6.
Figure 9:
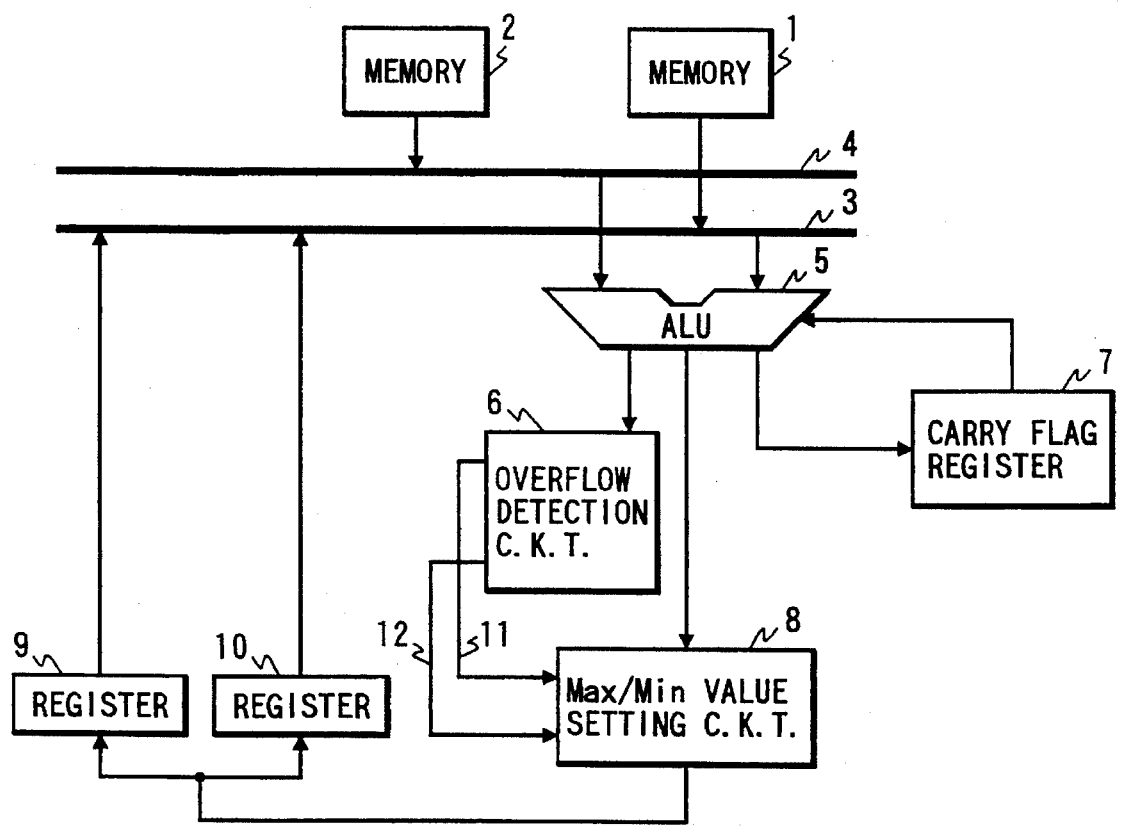
FIG. 9 is a block diagram which shows a conventional arithmetic apparatus.
Figure 10:
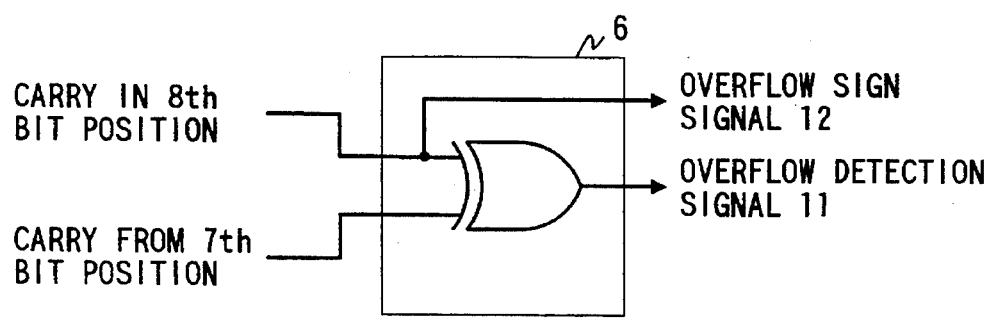
FIG. 10 is a circuit diagram which shows an overflow-detection circuit of a conventional arithmetic apparatus.
Figure 11:
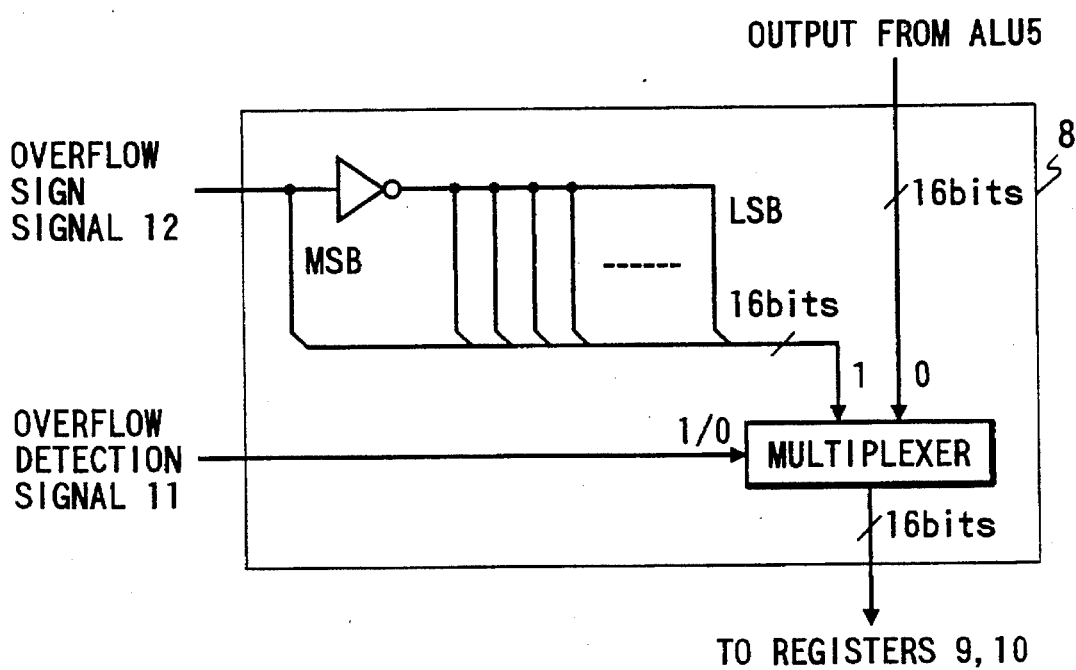
FIG. 11 is a circuit diagram which shows a maximum/minimum value-setting circuit of a conventional arithmetic apparatus shown.

The maximum/minimum value-setting circuit 8 includes, as shown in FIG. 8, first and second maximum/minimum value-outputting elements 81 and 82 and first and second multiplexers 83 and 84. The maximum/minimum value-outputting element 81 provides an 8-bit negative minimum value whose bit pattern is "10000000" when the overflow sign signal 16 shows a negative value (1) and an 8-bit positive maximum value whose bit pattern is "01111111" when the overflow sign signal 16 is a positive value (0). The maximum/minimum value-outputting element 82 provides a 16-bit negative minimum value of "1000000000000000" when the overflow sign signal 12 shows the negative value (1) and a 16-bit positive maximum value of "0 111111111111111" when the overflow sign signal 12 is the positive value (0).

The multiplexer 83 is responsive to the overflow-detection signal 11 of 0 to select the upper output (i.e., 8 higher-order bits) from the ALU assembly 5, while it provides the upper output (i.e., 8 higher-order bits) from the maximum/minimum value-outputting element 82 when the overflow-detection signal 11 is "1". The registers 9 and 10 store therein the outputs from the maximum/minimum value-setting circuit 8. Thus, the multiplexer 83, as long as the overflow-detection signal 11 shows "1", provides an 8-bit negative minimum value "10000000" in response to the overflow sign signal 12 of 1 and an 8-bit positive maximum value "01111111" when the overflow sign signal 12 shows "0".

The multiplexer 84 is responsive to a control signal from a controller 200 indicative of instructions to perform the parallel arithmetic operation to select either the lower output from the ALU assembly 5 or the output from the maximum/minimum value-outputting element 81 according to a value of the overflow-detection signal 15. When the overflow-detection signal 15 shows "0", the multiplexer 84 provides the lower output from the ALU assembly 5, while as long as the overflow-detection signal 15 indicates "1", it provides the 8-bit negative minimum value "10000000" when the overflow sign signal 16 shows "1" and the 8-bit positive maximum value "01111111" when the overflow sign signal 16 shows "0".

Alternatively, when the controller 200 does not instruct to perform the parallel arithmetic operation, the multiplexer 84 selects either one of the lower output from the ALU assembly 5 and the output of the 8 lower-order bits from the maximum/minimum value-outputting element 82. When the overflow-detection signal 11 shows "0", the multiplexer 84 provides the lower output from the ALU assembly 5, while as long as the overflow-detection signal 11 indicates "1", it provides an 8-bit value "00000000" when the overflow sign signal 12 shows "1" and an 8-bit value "11111111" when the overflow sign signal 12 shows "0".

In the double precision arithmetic operation, 16 lower-order bit data XL of 32-bit data X stored in the memory 1 and 16 lower-order bit data YL of 32bit data Y stored in the memory 2 are initially read out. The lower 8-bit arithmetic logic unit of the ALU assembly 5 then performs arithmetic operations from a first bit to an 8th bit. Similarly, the upper 8-bit arithmetic logic unit performs arithmetic operations from a 9th bit to a 16th bit. In these operations, a carry, when produced in the 8th bit position in the lower 8-bit arithmetic logic unit, is added to the 9th bit in the upper 8-bit arithmetic logic unit. In addition, a carry, when produced in the highest-order position, or 16th bit position, is stored in the carry flag register 7.

The operation results of the lower 8-bit arithmetic logic unit are inputted to the multiplexer 84 of the maximum/minimum value-setting circuit 8, while the operation results of the upper 8-bit arithmetic logic unit are transferred into the multiplexer 83. The multiplexers 83 and 84 then select as its output the operation results of the upper and lower 8-bit arithmetic logic units, respectively, so that 16-bit data defined by a combination of both operation results is provided by the maximum/minimum value-setting circuit 8 to the register 10.

Subsequently, 16 higher-order bit data XU of the 32-bit data X stored in the memory 1 and 16 higher-order bit data YU of the 32 bit data Y stored in the memory 2 are read out. Using the upper and lower 8-bit arithmetic logic units of the ALU assembly 5, an addition and subtraction of the data XU and YU and a value of the carry flag register 7 are performed. The operation results of the lower 8-bit arithmetic logic unit are inputted to the multiplexer 84 of the maximum/minimum value-setting circuit 8, while the operation results of the upper 8-bit arithmetic logic unit are inputted to the multiplexer 83.

The overflow-detection circuit 6, when the operation results of the upper 8-bit arithmetic logic unit overflow, provides the overflow-detection signal 11 and the overflow sign signal 12 indicative of a direction of the overflow. In response to the overflow-detection signal 11, the multiplexer 83 of the maximum/minimum value-setting circuit 8 selects upper 8 bits of either the 16-bit positive maximum value or the 16-bit negative minimum value outputted from the maximum/minimum value-outputting element 82 according to the overflow sign signal 12. Additionally, the double precision operation instruction-received multiplexer 84 selects lower 8 bits of the 16-bit data produced from the maximum/minimum value-outputting element 82. Thus, upon occurrence of overflow, the maximum/minimum value-setting circuit 8 provides to the register 9 a 16-bit maximum or minimum value defined by a combination of the upper and lower 8 bits outputted from the multiplexers 83 and 84.

Alternatively, when an overflow condition is not encountered, the multiplexers 83 and 84 output the operation results of the upper and lower 8-bit arithmetic logic units of the ALU assembly 5, respectively, so that they are combined into 16-bit data and then are stored in the register 9.

When the overflow occurs, the overflow-detection signal 11 and the overflow sign signal 12 are, similar to the first embodiment, inputted from the overflow-detection circuit 6 to the correction value-setting circuit 13 so that it corrects a value stored in the register 10 to "f f f f" or "0000".

The parallel arithmetic operation of half bits will be discussed below. In this operation, two addition operations (XU'+YU', XL'+YL') of four 8-bit data XU', XL', YU', and YL' are performed in the following manner.

Assume that the data XU' and the data XL' are placed in upper and lower 8 bit locations of the memory 1, respectively, and the data YU' and YL' are stored in upper and lower 8 bit locations of the memory 2, respectively. Initially, from the memory 1, the data XU' and XL' are provided to the ALU assembly 5 through the bus 3, while the data YU' and YL' are read out of the memory 2 to be inputted through the bus 4. In the ALU assembly 5, the upper 8-bit arithmetic logic unit performs an addition operation (XU'+YU') and at the same time, the lower 8-bit arithmetic logic unit performs an addition operation (XL'+YL'). In these operations, a carry shifted from the 8th bit position to the 9th bit position is set to zero (0).

The first overflow-detection circuit 6, when the operation results of the upper 8-bit arithmetic logic unit of the ALU assembly 5 overflow, provides the overflow-detection signal 11 and the overflow sign signal 12 indicative of a direction of the overflow. When the overflow-detection signal 11 is provided, or becomes active, the multiplexer 83 of the maximum/minimum value-setting circuit 8 provides upper 8 bits "01111111" of a 16-bit positive maximum value produced from the maximum/minimum value-outputting element 82 when the overflow sign signal 12 is positive, while it provides upper 8 bits "10000000" of a 16-bit negative minimum value when the overflow sign signal 12 is negative.

Alternatively, when the overflow-detection signal 11 is not active, the multiplexer 83 provides the output from the upper 8-bit arithmetic logic unit of the ALU assembly 5 as is.

The second overflow-detection circuit 14, when the operation results of the lower 8-bit arithmetic logic unit of the ALU assembly 5 overflow, provides the overflow-detection signal 15 and the overflow sign signal 16 indicative of a direction of the overflow. When the overflow-detection signal 15 is provided, or becomes active, the multiplexer 84 of the maximum/minimum value-setting circuit 8 provides an 8-bit positive maximum value "01111111" produced by the maximum/minimum value-outputting element 81 when the overflow sign signal 16 is positive, while it provides an 8-bit negative minimum value "10000000" when the overflow sign signal 16 is negative. Alternatively, when the overflow-detection signal 15 is not active, the multiplexer 84 provides the output from the lower 8-bit arithmetic logic unit of the ALU assembly 5 as is.

The outputs from the multiplexers 83 and 84 are combined into a 16-bit data, which is, in turn, stored in the register 9.

In the above manner, the arithmetic apparatus of the third embodiment can perform the 8-bit addition operation twice at the same time. Further, even when overflow has occurred in each addition operation, a precise overflow correction may be carried out.

While in the above third embodiment, the maximum/minimum value-outputting element 81 and the multiplexer 84 for the 8-bit overflow correction of lower arithmetic operation results in the ALU assembly 5, are arranged in the maximum/minimum value-setting circuit 8, they may alternatively be disposed in the correction value-setting circuit 13. In this case, in upper 8 bit locations of the register 10, upper 8-bit data of the ALU assembly 5 which is overflow-corrected through the maximum/minimum value-outputting element 82 and the multiplexer 83, is stored, while in lower 8 bit locations, lower 8-bit data of the ALU assembly 5 is placed. In addition, the overflow-detection signal 15 and the overflow sign signal 16 provided from the overflow-detection circuit 14 are inputted to the correction value-setting circuit 13. The correction value-setting circuit 13, when data is read out of the register 10 to output it to the bus 3, provides upper 8 bits of the register 10 as is, while it overflow-corrects lower 8 bits thereof in the same manner as described above.

Further, in the third embodiment, the 8-bit arithmetic operation is performed twice at the same time, however, when four overflow-detection circuits and four maximum/minimum value-outputting circuits are arranged in parallel, a 4-bit arithmetic operation can be carried out four times in parallel and a precise overflow correction can also be made at high speed.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An arithmetic apparatus comprising:

arithmetic operation means for performing given arithmetic operations of double precision data having a preselected number of bits;

a first register storing results of the arithmetic operation of higher-order bits in the double precision data;

a second register storing results of the arithmetic operation of lower-order bits in the double precision data;

overflow-detection means for detecting overflow conditions of the results of the arithmetic operations performed by said arithmetic operation means;

maximum/minimum value-setting means for setting the results of the arithmetic operation to be stored in said first register to one of maximum and minimum values according to the overflow conditions detected by said overflow-detection means; and correction means for correcting an output value indicative of the result of the arithmetic operation outputted from said second register to one of a first value defined by a bit sequence of 0s and a second value defined by a bit sequence of 1s according to the overflow condition detected by said overflow-detection means.

2. An arithmetic apparatus as set forth in claim 1, wherein said correction means operates for correcting the output value outputted from said second register to one of a first value defined by a bit sequence of only 0s and a second value defined by a bit sequence of only 1s according to the detected overflow condition.

3. An arithmetic apparatus as set forth in claim 1, wherein said correction means operates for correcting the output value outputted from said second register in accordance with an overflow condition detected by said overflow-detection means in the results of the arithmetic operation of the higher-order bits in the double precision data.

4. An arithmetic apparatus as set forth in claim 1, wherein said arithmetic operation means has a data width substantially one half the preselected number of bits in said double precision data.

5. An arithmetic apparatus comprising:

arithmetic operation means for performing a given arithmetic operation of higher-order bits and lower-order bits of double precision data;

overflow-detection means for detecting overflow conditions of results of the arithmetic operation performed by said arithmetic operation means;

maximum/minimum value-setting means for setting the results of the arithmetic operation in the higher-order bits of the double precision data to one of maximum and minimum values according to the overflow conditions detected by said overflow-detection means; and correction means for correcting the results of the arithmetic operation in the lower-order bits of the double precision data to one of a first value defined by a bit sequence of 0s and a second value defined by a bit sequence of 1s according to the overflow conditions detected by said overflow-detection means.

6. An arithmetic apparatus as set forth in claim 5, wherein said correction means operates for correcting the results of the arithmetic operation in the lower-order bits of the double precision data to one of a first value defined by a bit sequence of only 0s and a second value defined by a bit sequence of only 1s according to the detected overflow condition.

7. An arithmetic apparatus as set forth in claim 5, wherein said correction means corrects the results of the arithmetic operation in the lower-order bits in the double precision data in accordance with an overflow condition detected by said overflow-detection means in the results of the arithmetic operation of the higher-order bits in the double precision data.

8. An arithmetic apparatus as set forth in claim 5, wherein said arithmetic operation means has a data width substantially equal to a number of bits in one of said higher-order bits and said lower-order bits of said double precision data.

9. An arithmetic apparatus comprising:

arithmetic operation means for performing a plurality of parallel arithmetic operations;

a plurality of overflow-detection means for detecting overflow conditions of results of the arithmetic operations performed by said arithmetic operation means, respectively; and a plurality of maximum/minimum value-setting means for setting the results of the arithmetic operations performed by said arithmetic operation means to one of maximum and minimum values according to the overflow conditions detected by said overflow-detection means, respectively.

10. An arithmetic apparatus as set forth in claim 9, further comprising a register for storing one of the results of the arithmetic operations performed by said arithmetic operation means, at least one of said maximum/minimum value-setting means being provided to correct an output value indicative of the results of the arithmetic operation stored in the register to one of the maximum and minimum values according to the overflow conditions detected by corresponding one of said overflow-detection means.

11. An arithmetic apparatus as set forth in claim 9, wherein said arithmetic operation means performs a given arithmetic operation of double precision data having a preselected number of bits, correction means being further provided for correcting results of the given arithmetic operation of lower-order bits in the double precision data to one of a first value defined by a bit sequence of 0s and a second value defined by a bit sequence of 1s according to the overflow conditions detected by corresponding one of the overflow-detection means.

12. An arithmetic apparatus as set forth in claim 11, wherein said correction means corrects the results of the arithmetic operation of the lower-order bits in the double precision data to be one of a first value defined by a bit sequence of only 0s and a second value defined by a bit sequence of only 1s according to the detected overflow conditions.

13. An arithmetic apparatus as set forth in claim 12, wherein said correction means operates for correcting the results of the arithmetic operation of lower-order bits in accordance with an overflow condition detected in the results of the arithmetic operation of the higher-order bits in the double precision data.

14. An arithmetic apparatus as set forth in claim 11, wherein said arithmetic operation means has a data width substantially equal to a number of bits in said lower-order bits of said double precision data.

15. In a method for performing, in parallel, a plurality of arithmetic operations of data having a preselected number of bits less than the number of bits handled by an arithmetic apparatus, the method comprising the steps of:

detecting overflow conditions of results of the arithmetic operations, respectively; and correcting the overflowing results of the arithmetic operations to one of maximum and minimum values each formed with said preselected number of bits according to the overflow conditions detected.

* * * * *